United States Patent [19]

Sato et al.

[11] Patent Number: 4,680,964
[45] Date of Patent: Jul. 21, 1987

[54] HEAT-WIRE TYPE AIRFLOW QUANTITY MEASURING APPARATUS

[75] Inventors: Yoshihisa Sato, Nagoya; Masumi Kinugawa, Okazaki; Susumu Akiyama, Kariya; Toshitaka Yamada, Nagoya; Tiaki Mizuno, Toyota; Atsushi Suzuki, Oobu; Kengo Sugiura, Anjo, all of Japan

[73] Assignee: Nippondenso Co., Ltd., Kariya, Japan

[21] Appl. No.: 874,854

[22] Filed: Jun. 16, 1986

[30] Foreign Application Priority Data

Jun. 18, 1985 [JP] Japan ................. 60-130865
Sep. 4, 1985 [JP] Japan ................. 60-195324
Sep. 12, 1985 [JP] Japan ................. 60-202393

[51] Int. Cl.⁴ .................... G01F 1/68; G01M 19/00
[52] U.S. Cl. ..................... 73/204; 73/118.2
[58] Field of Search ............... 73/118.2, 204; 307/10 R; 364/510; 123/494

[56] References Cited

U.S. PATENT DOCUMENTS 3,975,951  8/1976  Kohama et al. .......... 73/116
4,043,195  8/1977  Hunting ................. 73/204
4,058,089 11/1977  Schmidt et al. .......... 123/494
4,384,484  5/1983  Kohama et al. .......... 73/204
4,565,091  1/1986  Ito et al. ................ 73/204
4,596,138  6/1986  Ito et al. ................ 73/204
4,612,894  9/1986  Satoh et al. ............. 123/494

FOREIGN PATENT DOCUMENTS

1345324  1/1974  United Kingdom .

Primary Examiner—Jerry W. Myracle
Assistant Examiner—Robert R. Raevis
Attorney, Agent, or Firm—Cushman, Darby & Cushman

[57] ABSTRACT

A heater, which comprises an element whose resistance varies with changes in temperature, and a temperature element are provided in the air intake pipe of an engine. This heater and temperature element together with resistors form a bridge circuit to which heating power is supplied via a transistor. An engine control unit generates start signals Tin simultaneously with the rotation of the engine. A flip-flop circuit is set by these start signals and, when set, the transistor is turned on and the heating power rises. The output signal from the bridge circuit is supplied to a comparator and the output signal of the comparator resets the flip-flop circuit, which outputs a pulse-shaped signal representing the airflow quantity as a length of time. This pulse-shaped time signal is sent via a constant current circuit to another comparator, where it is compared with a reference voltage and the output signal from the comparator is supplied together with the above time signal to an exclusive OR circuit. This exclusive OR circuit outputs a first and second pulse signal as the measurement output signal Tout synchronously with the rise and fall of the time signal and this signal is supplied to the engine control unit.

17 Claims, 32 Drawing Figures

HEAT-WIRE TYPE AIRFLOW QUANTITY MEASURING APPARATUS

BACKGROUND OF THE INVENTION

The invention relates to a heat-wire type airflow quantity measuring apparatus, which is used as one means for detecting the operating state of an automobile engine and which comprises intake airflow quantity detecting means such that even if the voltage is not stable, for example, accurate measurement data can be supplied to the engine control, which comprises a microcomputer, for accurate engine control and accurate control of the fuel injection amount and the ignition timing, etc. that is most suitable for the engine operating state.

The engine operating conditions such as the fuel injection amount and the ignition timing, etc. are calculated by an engine control unit (ECU), which is comprised of a microcomputer, and, based on the calculation results, the injection amount and ignition timing are controlled. This kind of electronic control unit calculates the engine operation conditions based on detection signals from a plurality of sensors that monitor the engine. Examples of the kind of sensors that may be used are: a rotation sensor which outputs detection signals at specified angles of crankshaft rotation, an engine coolant temperature sensor, throttle opening sensor, an air/fuel ratio sensor which detects the oxygen density in the exhaust gas, and a battery voltage sensor. An example of a sensor that directly detects the engine operating state is an intake airflow quantity sensor. The engine control unit calculates the basic fuel injection amount and the ignition timing corresponding to the detected intake airflow quantity. These basic values are corrected based on the other detection data such as engine RPM and coolant temperature, and instructions are supplied to the fuel injection mechanism and the ignition timing control device.

An example of this kind of intake airflow quantity measuring means that is used in the engine control apparatus is the heat-wire type intake airflow measuring means disclosed in U.S. Pat. No. 3,975,951.

With this apparatus a heating current is supplied to a heater whose electrical resistance varies with changes in temperature and which is located in the air intake pipe. By measuring the changes in resistance, which is indicative of the changes in temperature resulting from the flow of air past the heater, it is possible to determine the quantity of air flowing in the intake air pipe. When the airflow is large, the rise in temperature of the heater is slower for a given heating current than when the airflow is small, therefore, it is possible to calculate the intake air quantity based on this heating current because in order to maintain the same temperature a heating current must increase in proportion to the quantity of the airflow.

With this kind of measuring device, however, the measurement signals are analog and in order to be used by the control unit they must first be converted to digital by an A/D converter. For this kind of control unit an extremely accurate A/D converter is required, which complicates the measurement signal processing means.

SUMMARY OF THE INVENTION

An object of the invention is to provide a heat-wire type intake airflow quantity measuring apparatus that accurately measures the intake airflow in the air intake pipe of an engine and that supplies digital signals that can be used directly by the microcomputer of the engine control unit.

Another object of the invention is to provide a heat-wire type intake airflow quantity measuring apparatus in which the signal processing means is improved such that digital signals supplied to the engine control unit are not affected by changes in voltage, for example, and maintain their accuracy to thereby make possible reliable and accurate engine control.

Another object of the invention is to provide a heat-wire type intake airflow quantity measuring apparatus in which the pulsation of the intake airflow, which occurs synchronously with the rotation of the engine, is used to accurately measure the intake airflow quantity.

In this invention a heater whose electrical resistance varies with changes in temperature is placed in the airflow that is to be measured. This heater is heated by a heating current which is supplied to the heater and which rises in response to periodically generated start signals. When the heater reaches a specified temperature, the heating current is cut off and the pulse-shaped signal, which indicates the length of time that heating current is supplied to the heater, is output as the airflow quantity measurement signal. This pulse measurement signal is converted by a signal conversion means to a pair of pulse signals each of which corresponds to the rising portion and the falling portion of the signal. This pair of pulse signals is then output as the airflow quantity measurement detection signal. If what is being measured is the intake airflow then the start signals are generated synchronously with the rotation of the engine.

In other words, this heating current supplied to the heater rises synchronously with the rotation of the engine, for example, and the temperature of the heater increases with a speed corresponding to the airflow quantity. When a specified temperature is reached, the heating current is cut off with the length of time that current is supplied corresponding to the airflow quantity. Namely, a pulse-shaped signal, which rises with the start signal and falls when the heater reaches a specified temperature, is used as the measurement signal and a pair of pulse signals generated in correspondence to the rising and falling portions of the measurement signal is output as the measurement detection signal. The time interval of the pulse signal indicates the airflow quantity and this signal is supplied to the control unit as digital data which shows the count value of this interval.

When this measurement signal is a time interval signal as described above, if the signal processing is performed by a circuit that includes a time constant circuit and if there are voltage fluctuations, the time interval indicated by the signal will vary, making it difficult to obtain accurate measurement detection signals. However, if the time interval is expressed by a pair of pulse signals as was described above, it is possible to reliably maintain the measurement accuracy even in the signal conversion process.

DETAILED DESCRIPTION OF THE PREFERRED EMBODIMENTS

Figure 1:
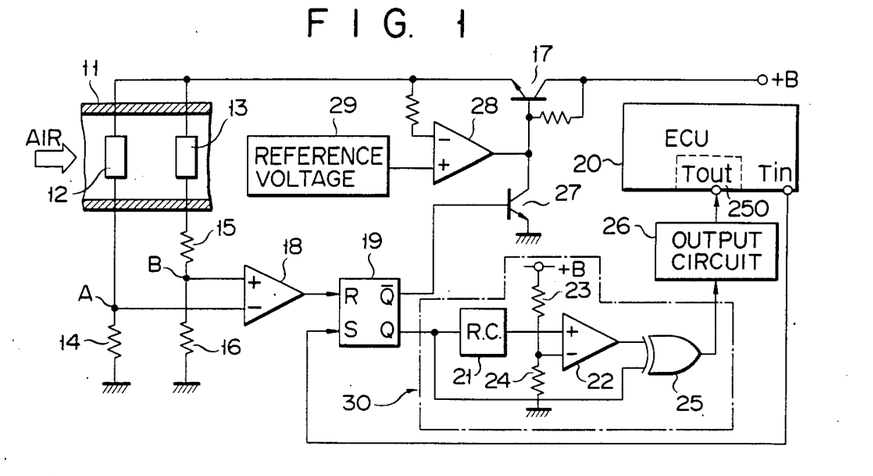
FIG. 1 shows a circuit diagram of the intake airflow measurement apparatus according to the first embodiment of the invention

FIG. 1 shows an embodiment in which the intake airflow quantity of an engine is measured. Accordingly, the airflow to be measured flows in air intake pipe 11 of the engine and heater 12 is provided in air intake pipe 11 exposed to the airflow. Air temperature element 13 is also located in intake pipe 11.

Both heater 12 and air temperature element 13 are comprised of resistance elements whose electrical resistance varies with changes in temperature, such as a platinum wire, for example. The resistance value of air temperature element 13 corresponds to the temperature value of the air flowing in intake pipe 11.

Heater 12 and temperature element 13 are connected to a series circuit of fixed resistors 14, 15 and 16. Heater 12, resistor 14, resistors 15 and 16 form a bridge circuit with node A between heater 12 and resistor 14 and node B between resistors 15 and 16 forming output terminals. Power source +B is connected via a switching element comprised of transistor 17 to the node which is between heater 12 and temperature element 13 and which constitutes the input terminal of the bridge circuit. When transistor 17 is on, heating current is supplied to heater 12.

The potentials of nodes A and B, which constitute the output terminals of the bridge circuit, are compared by comparator 18. Comparator 18 generates an output signal when the potential of A is lower than that of B, or, in other words, when the temperature of heater 12 rises until there is a specified temperature difference between the temperature of heater 12 and the temperature of the air as measured by temperature sensor 13. This output signal resets flip-flop circuit 19.

Flip-flop circuit 19 is set by start signal Tin from engine control unit 20. This start signal is a generated pulse signal based on signals that are supplied to engine control unit 20 synchronously with the rotation of the engine.

When flip-flop circuit 19 is set, its output signal Q is supplied to time constant circuit 21 of signal conversion circuit 30. The output signal of time constant circuit 21 is supplied to comparator 22. A reference voltage divided by resistors 23 and 24 is supplied to comparator 22 and when the output signal voltage from time constant circuit 21 is higher than the reference voltage, the output signal from comparator 22 goes to high level. The output signal from comparator 22 is supplied to exclusive OR circuit 25 together with signal Q output when flip-flop circuit 19 is set. The output signal from exclusive OR circuit 25 is supplied to output circuit 26 as the output from signal conversion circuit 30 and the output signal from output circuit 26 is supplied to engine control unit 20 as the airflow quantity measurement detection signal Tout.

The signal $\overline{Q}$ output when flip-flop circuit 19 is reset controls transistor 27. Transistor 27 opens and closes the base circuit of transistor 17. When flip-flop circuit 19 is set, transistor 27 is off and transistor 17 is on. When transistor 17 is on, heating current is supplied to heater 12.

The voltage of the power supplied to the bridge circuit that includes heater 12 is set by operational amplifier 28. Operational amplifier 28 compares the voltage of the heating power supplied to heater 12 and the reference voltage set by reference power source circuit 29 and controls the base potential of transistor 17 so that the voltage value of the heating power is kept at a constant level.

Figure 2:
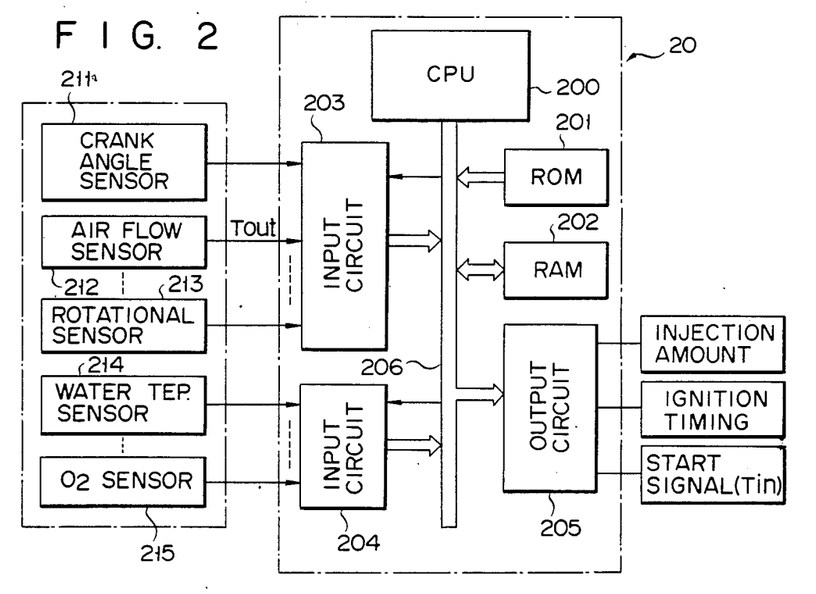
FIG. 2 shows the construction of the control unit used in the above embodiment.

FIG. 2 shows an example of engine control unit 20, which comprises a microcomputer. In engine control unit 20, ROM 201, which stores the program data, RAM 202, which stores the operating data, input circuits 203 and 204, and output circuit 205 are connected to CPU 200 via data bus 206. Rotation angle signals from crankshaft rotation angle sensor 211, airflow quantity detection signals from airflow sensor 212 such as that used in this embodiment, and rpm signals from rpm sensor 213, etc. are supplied to input circuit 203. The detection signals from coolant temperature sensor 214 and detection signals from air/fuel ratio sensor 215 are supplied to input circuit 204. Based on these input signals, CPU 200 calculates a suitable fuel injection amount and ignition timing, etc., which are output from output circuit 205 as fuel quantity commands and ignition timing commands. Start signal Tin is generated and output based on the detection signal from crankshaft angle sensor 211.

Figure 3A:
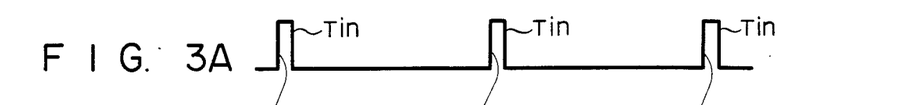
FIGS. 3A to 3D are waveform diagrams of the signals during the intake air measurement operation.
Figure 3B:
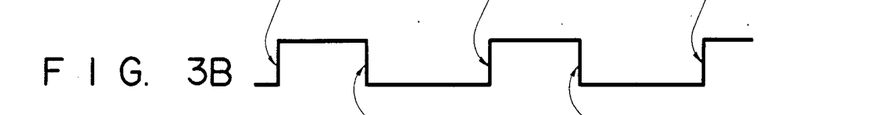
Figures 3C, 3D:
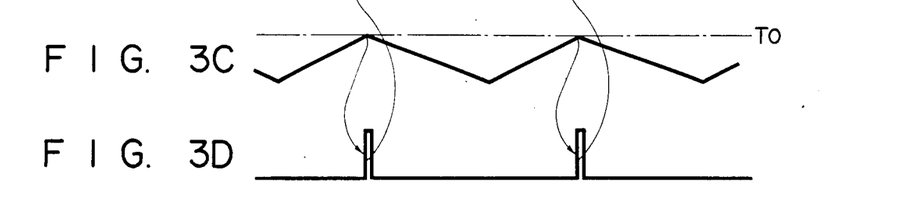

The pulse start signal, which is synchronous with the rotation of the engine as is shown in FIG. 3A, is output from engine control unit 20 and this signal sets flip-flop circuit 19. Output signal $\overline{Q}$ from flip-flop circuit 19 rises as shown in FIG. 3B. When flip-flop circuit 19 is set in this way, transistor 17 is turned on, the heating power supplied to heater 12 rises, and, as shown in FIG. 3C, the temperature of heater 12 rises at a rate corresponding to the quantity of the airflow in intake pipe 11. When the temperature of heater 12 reaches a temperature T0 which is a set amount different from the temperature measured by airflow temperature sensor 13, an output signal from comparator 18 such as that shown in FIG. 3D is generated and flip-flop circuit 19 is reset, whereupon the heating current drops.

The temperature of heater 12 rises in inverse proportion to the quantity of airflow in intake pipe 11: when the airflow is large, the temperature rise velocity is low, so the time that flip-flop circuit 19 is set increases, as shown in FIG. 3B. This means that the time that heating current is supplied to heater 12 is indicative of the airflow quantity and so the pulse-shaped time signal generated when flip-flop circuit 19 is set can be used as the airflow quantity measurement signal.

Figure 4A:
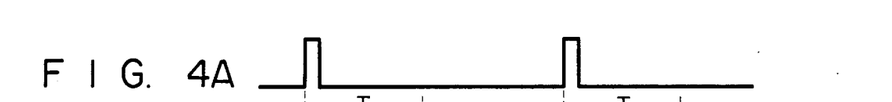
FIGS. 4A to 4D are waveform diagrams of the signals of the signal processing means.
Figures 4B, 4C, 4D:
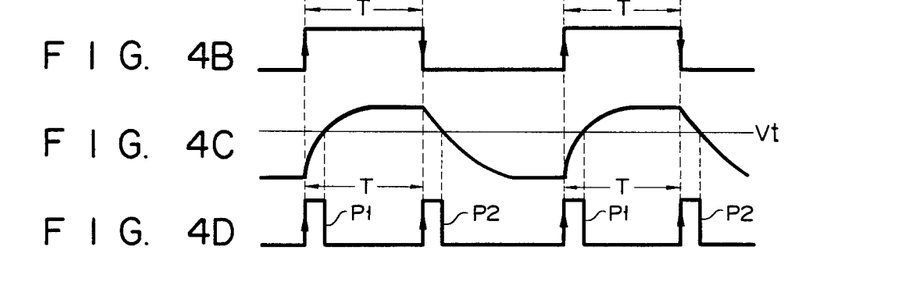

A pulse-shaped time signal such as that shown in FIG. 4B can be obtained from flip-flop circuit 19 in response to start signal Tin shown in FIG. 4A. This time interval T is indicative of the airflow quantity. This signal is supplied to time constant circuit 21 and the signal's rise and fall portions are integrated and output in the form shown in FIG. 4C.

Comparator 22 outputs a high level signal when the voltage of the signal output from time constant circuit 21 is higher than reference voltage Vt which is set by resistors 23 and 24. Accordingly, exclusive OR circuit 25 outputs a first pulse P1 which rises as shown in FIG. 4D in response to the rise of the signal shown in FIG. 4B and which drops when the output of comparator 22 goes to high level, and a second pulse P2 which rises in response to the drop of the signal shown in FIG. 4B and which drops when the output from the comparator 22 is inverted to low level. Namely, signal conversion circuit 30 generates a measurement detection signal Tout based on a pair of pulses that correspond to the rise and fall of the pulse-shaped time signal. The rise timing of each of these pulses P1 and P2 is equal to the measurement time interval T (FIG. 4B) generated when flip-flop circuit 19 is set.

Figure 5:
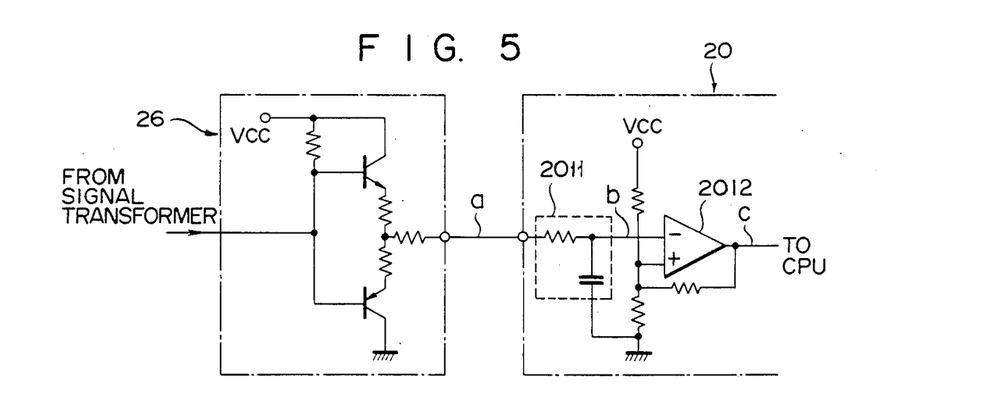
FIG. 5 is a circuit diagram of the output circuit of the above apparatus.

RC filter 2011, which has a time constant of several tens to several hundreds of μsec. and which is shown in FIG. 5, is inserted into the input circuit section of engine control unit 20 to eliminate ignition pulse noise, etc. Accordingly, a pulse signal, such as that shown in FIG. 6, A1, for example, that expresses the time interval T, which corresponds to the output signal from flip-flop circuit 19 is supplied directly to output circuit 26. When this signal is supplied to input section a of control unit 20, the b portion of the signal after having passed filter 2011 has the shape shown at B1 of FIG. 6. This signal is then supplied to comparator 2012.

Figure 6:
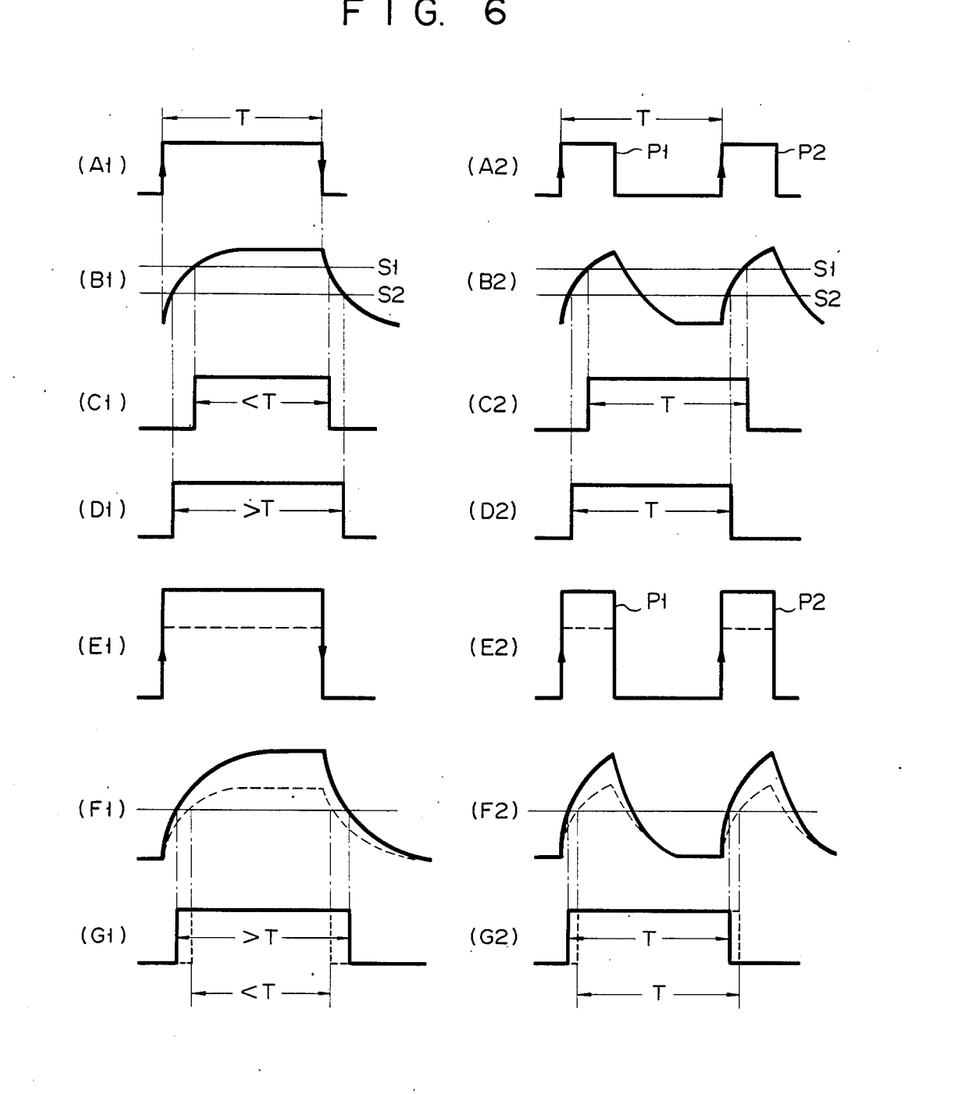
FIG. 6 is a waveform diagram comparing the differences when the signals are processed and when they are not.

If it is assumed that the threshold voltage corresponding to the reference voltage set by the resistor circuits is set as shown by S1 in the drawing, then a signal which has the waveform shown at C1 of FIG. 6 is supplied to output point c enroute to the CPU of control unit 20. When the threshold value is S2, which is lower than S1, the signal at point c has the waveform shown at D1 of FIG. 6. Based on this change in threshold value to S1 and S2, the time interval of the time signal supplied to the CPU is shorter and longer than the time interval T of the input time signal shown at A1 respectively and the changes in the threshold value have a direct effect on the pulse width of the output pulse signal.

This threshold value is determined by dividing the source voltage so the time interval, which expresses the airflow measurement value, is very sensitive to changes in the source voltage of control unit 20.

In E1 of FIG. 6, for example, when the peak value of the input pulse signal increases as shown by the solid line, the time interval of the signal at point c becomes larger than T, as is shown at G1 of FIG. 6, even if the threshold value of control unit 20 remains constant. In other words, the time interval of the measurement signal supplied to control unit 20 is affected by the source voltage on the output circuit 26 side.

By comparison, with the apparatus of this embodiment a pair of pulses P1 and P2, which expresses the time interval T, as shown at A2 of FIG. 6, is supplied to control unit 20. Accordingly, the time interval T of the mutual leading edge of the pulses P1 and P2 is supplied as an accurate measurement detection signal Tout unaffected by changes in the threshold value and by changes in the peak value of input pulse signal, as can be seen by A2 to G2 in FIG. 6. Consequently, it is not necessary that output circuit 26 and the power source (not shown) provided in control unit 20 operate very accurately, and it is not necessary to adjust the peak voltage value of pulse signal input to control unit 20.

Figure 7:
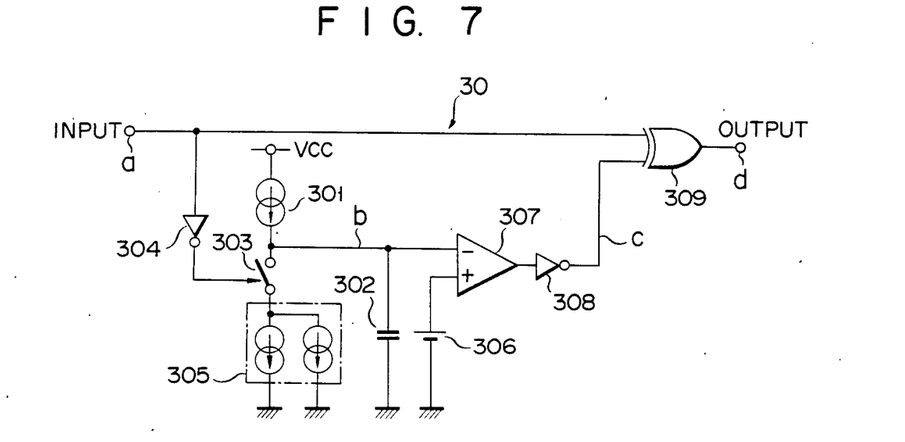
FIG. 7 is a circuit diagram of another example of the signal processing means.

FIG. 7 shows another example of signal conversion circuit 30, which converts the pulse-shaped time signal supplied from flip-flop circuit 19 into the pair of pulse signals. In this case a pulse time signal such as that shown in FIG. 8A is supplied to the input terminal a.

Circuit 30 is equipped with capacitor 302, which is charged by a current from constant current circuit 301, and which is connected in parallel with switch 303, which forms the discharge circuit. Switch 303 comprises a switch element that is closed when the output signal level of inverter 304, which supplies a signal to switch 303, is high. Switch 303 is connected to ground via constant current circuit 305 and when closed, the discharge current of capacitor 302 is made constant.

Figure 8A:
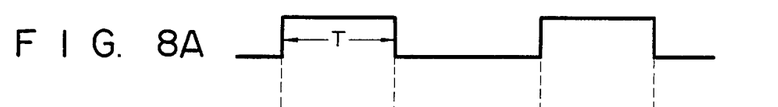
FIGS. 8A to 8D are waveform diagrams illustrating the signal processing.

As shown in FIG. 8A, when the input signal at point a rises, the output of inverter 304 goes to low level, switch 303 is turned off and capacitor 302 is charged by a constant current. This charging time constant is set by constant current circuit 301. In this way capacitor 302 is charged to the state shown in FIG. 8B and when the charging potential exceeds voltage Vt, which is set by reference voltage source 306, the output of comparator 307 is inverted to low level. The output signal of comparator 307 is inverted by inverter 308, and thus rises as illustrated in FIG. 8C. The output signal of inverter 308 is supplied to exclusive OR circuit 309. Accordingly, the first pulse signal P1 from exclusive OR circuit 309 rises in correspondence to the rise of the input signal and the first pulse signal drops in correspondence to the rise of the output signal of inverter 308 such as that shown at P1 of FIG. 8D. Then capacitor 302 is charged to source voltage value Vcc.

Figure 8B:
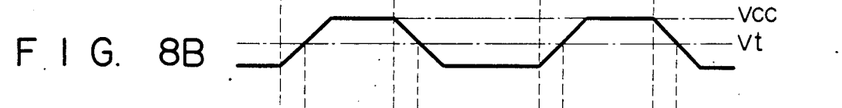
Figure 8C:
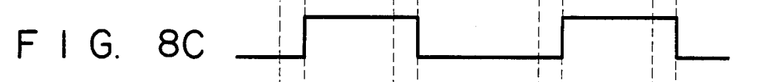
Figure 8D:
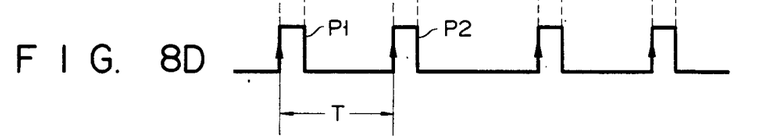

When the input signal shown in FIG. 8A drops, switch 33 is closed and capacitor 302 is discharged for a constant time period via constant current circuit 305 so that the terminal voltage of the capacitor 302 drops for a constant time period as shown in FIG. 8B. When the voltage of capacitor 307 falls below reference voltage Vt, the output signal of comparator 307 is inverted, and second pulse signal P2 shown in FIG. 8D, which has been supplied from exclusive OR circuit 309 rises as the input signal falls, and falls as the output signal of inverter 308 falls.

Figure 9A:
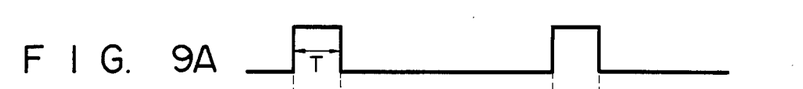
FIGS. 9A to 9D are waveform diagrams illustrating the signal processing when the time interval of the measurement signal is very short.
Figure 9B:
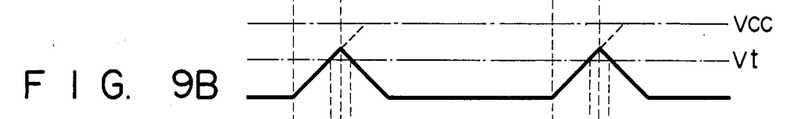
Figure 9C:
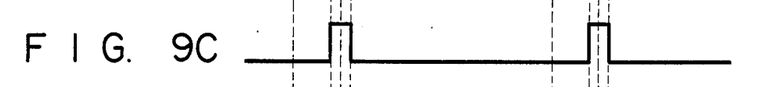

However, when this pair of pulses P1 and P2 is generated as was described above and the time interval T of the input time signal shown in FIG. 9A is short, the input signal drops before capacitor 302 is charged to Vcc, as is shown in FIG. 9B. Then, together with the drop of the input signal, switch 303 is turned on and capacitor 302 is discharged. Accordingly, in this state, the output signal from inverter 308 has the shape shown in FIG. 9C and the output signal from exclusive OR circuit 309 has the shape shown in FIG. 9D.

Figure 9D:
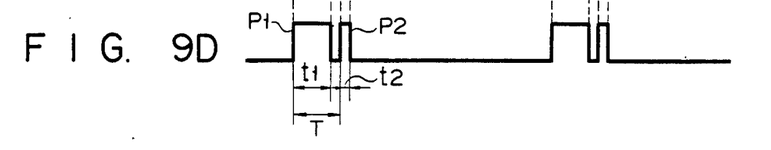

In other words, in this state, the time period t1 of the first pulse P1 is generated normally and the time period t2 of the second pulse P2 is abnormally small so that there is a problem of measuring the normal pulse cycle interval.

Figure 10:
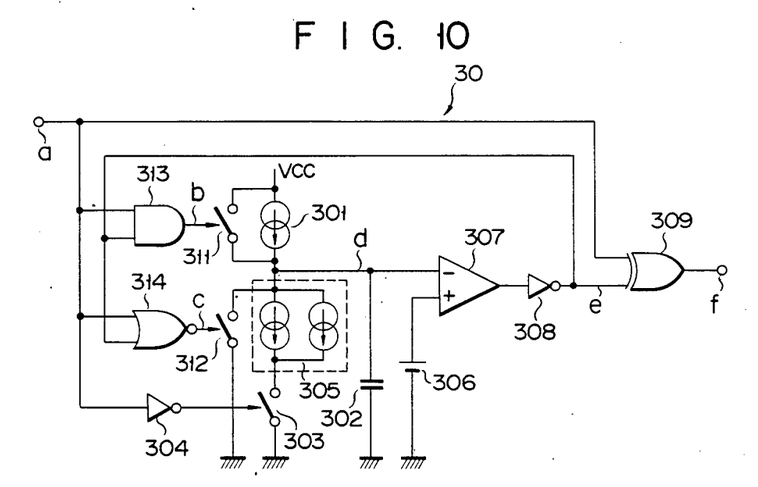
FIG. 10 is a circuit diagram of another example of a signal converting circuit.

FIG. 10 shows an embodiment of a signal conversion circuit 30 in which this point has been taken into consideration. Capacitor 302 is charged by a constant voltage from constant voltage circuit 301 and discharged through constant voltage circuit 305 and switch 303. Switches 311 and 312 are connected in parallel to constant current circuits 301 and 305. Switches 311 and 312 are turned on by the output signals from AND circuit 313 and NOR circuit 314 to which an input time signal from input terminal a and the output signal from inverter 308 are supplied.

With an apparatus constructed as described above, when in the initial period capacitor 302 is not yet charged, the output signal from comparator 307 is set at high level and the signal supplied to AND circuit 313 and NOR circuit 314 from inverter 308 is at the low level. Also, the input signal in the initial period is at low level and, accordingly, the output of AND circuit 313 is at low level and switch 311 is turned off. The output signal from NOR circuit 314 is at high level and switch 312 is turned on. Consequently, a discharge circuit for capacitor 302 is formed and the terminal voltage of capacitor 302 is at ground potential. In this case, switch 303 is turned on.

Figure 11A:
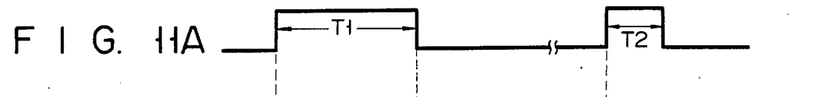
FIGS. 11A to 11F are waveform diagrams of the signals in the conversion process of the signal converting means.
Figures 11B, 11C:
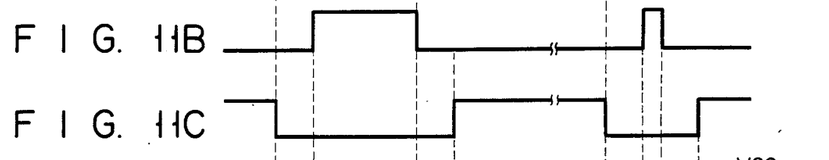

In this state, when the pulse signal having the time interval T1 shown in FIG. 11A is supplied to input terminal, the output of AND circuit 313 does not vary, as is shown in FIG. 11B, but, the output of inverter 304 is inverted and switch 303 turned off at the rising edge of this input signal. Simultaneously, the output of NOR circuit 314 drops as shown in FIG. 11C and switch 312 is turned off.

Figure 11D:
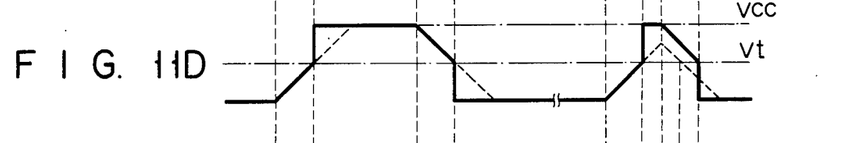

Accordingly, in this state, capacitor 302 is charged for a prescribed time constant by the current supplied via constant current circuit 301, so that the terminal voltage of capacitor 302 rises as shown in FIG. 11D.

Figure 11E:
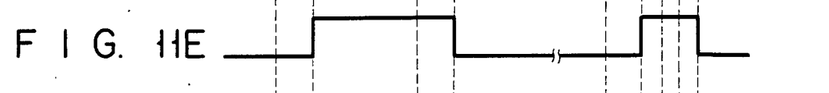

When the terminal voltage of capacitor 302, which has been charged in this way, exceeds the reference voltage Vt as set by reference power source 306, the output signal from comparator 307 is inverted to low level. Accordingly, the output signal from inverter 308 is inverted to high level as shown in FIG. 11E.

Figure 11F:
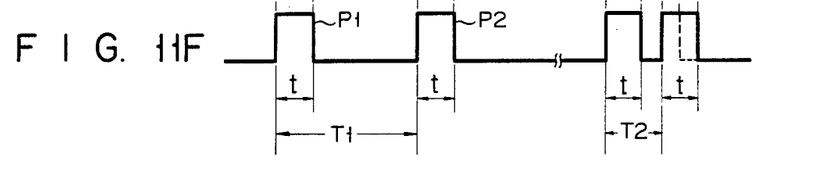

Consequently, the first pulse signal P1 from exclusive OR circuit 309 rises together with the rise of the input signal and the first pulse P1 drops with the rise in the output signal from inverter 308, as is shown in FIG. 11F. Since, at this time the output of inverter 308 is inverted to high level, the signal from AND circuit 313 goes to high level, as is shown in FIG. 11B, switch 311 is turned on, and capacitor 302 is rapidly charged by a current supplied through switch 311. Namely, as can be seen in FIG. 11D, the terminal voltage of capacitor 302 rises rapidly to source voltage Vcc after surpassing reference voltage Vt.

Next, when the input signal shown in FIG. 11A drops, the output signal of AND circuit goes to low level, switch 311 is turned off and the rapid charging circuit of capacitor 302 is cut off. Also, the output of inverter 304 goes to high level, switch 303 is closed and a discharging circuit for capacitor 302 is formed with constant current circuit 305. In other words, capacitor 302 is discharged for a prescribed time constant and the terminal voltage of capacitor 302 is reduced for the time constant shown in FIG. 11D. In this case switch 312 is still off.

Then, when the terminal voltage of capacitor 302 drops past reference voltage Vt, the output of comparator 307 is inverted to high level and the output of inverter 308 goes to low level. Accordingly, the output of NOR circuit 314 goes to high level, switch 312 is turned on, forming a rapid discharging circuit for capacitor 302 such that the terminal voltage of capacitor 302 drops rapidly to ground voltage level. The second pulse signal P2, which rises together with the input signal going to low level and drops together with the output signal of inverter 308 going to low level, as shown in FIG. 11F, is generated by Ex OR circuit 309.

The time interval T1 of the leading edge of pulse signal P1 and P2 output from exclusive OR circuit 309 match the time interval T1 of the input signal as can be understood from FIG. 11A. Accordingly, the first and second pulse P1 and P2 are supplied to control unit 20 as the airflow measurement detection signals. The pulse time interval is measured as the airflow quantity measurement data and is used to calculate the amount of fuel to be injected and the ignition timing, etc.

When a signal is supplied to this kind of signal conversion circuit, if it is assumed that the signal represents the measurement intake air quantity in the short time interval T2 as shown in FIG. 11A, then in response to the rise of this signal, a first pulse P1, the same as described above, will be generated. In this case the terminal voltage of capacitor 302 is charged rapidly to voltage Vcc when it has passed reference voltage Vt.

Then, when the input signal drops, switch 303 closes and a discharge time constant circuit is formed. In this case, since capacitor 302 is charged to source voltage Vcc, a second pulse P2 is generated in the same way as with an input signal having a time interval of T1.

In other words, the pulse widths of first and second pulses P1 and P2 are determined by the time required to charge capacitor 302 from ground potential to reference potential Vt and to discharge capacitor 302 from voltage Vcc to reference voltage Vt and these times are determined by constant current circuits 301 and 305, which form the charging and discharging circuits of capacitor 302. That is, the widths of the first and second pulse signals can easily be made equal to a prescribed value t.

Figure 12A:
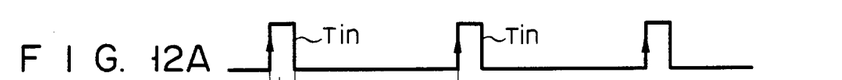
FIGS. 12A and 12B are waveform diagrams of output signals that are partially missing.
Figure 12B:
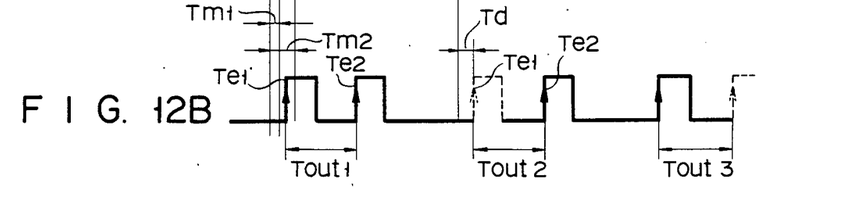

These pairs of pulses P1 and P2 which are generated in response to the individual start pulse signals have the shape shown in FIG. 12B and correspond to the shape of the start pulse signals Tin, as shown in FIG. 12A, which are generated from engine control unit 20. In this case, as a result of a switching delay arising in signal conversion circuit 30 and the changes in time occurring in the filter circuits of the input circuit section of the engine control unit 20, first pulse P1 rises at the time Te1 which is delayed from the rising edge of start pulse signal Tin. This time delay is set to be within the prescribed range of Tm1 to Tm2 in consideration of the temperature and the differences in the solid state characteristics.

The second pulse P2 also rises at a timing of Te2 and having the same delay from the dropping edge of the pulse-shaped time interval signal as stated above. The time interval Tout of time Te1 and Te2 is supplied to control unit 20 as airflow quantity measurement detection data.

However, faults in the connector and connecting harness result in part of edge Te2 or Te1 of the first and second pulses P1 and P2 not being supplied to the CPU of the microcomputer, which comprises engine control unit 20. Accordingly, in this case control unit 20 cannot measure the intake airflow quantity and the engine control calculations cannot be made.

In consideration of this difficulty, input signal processing section 250 (shown FIG. 1) is provided in the input section of control unit 20. A hypothesized standard delay time interval Td which rises within the range of Tm1 to Tm2 is stored in processing section 250. Then, for example, as shown by the broken line in FIG. 12B, when the first pulse P1 does not rise within the time range Tm1 to Tm2, a rising edge Te1 of the first pulse P1 is assumed to exist at a timing delayed by Td from the rising edge of the start pulse signal.

The time interval Tout 2 between edge Te1, which is delayed from the rising edge of start pulse signal Tin by delay Td, and the rising edge Te2 of the second pulse P2 expresses the airflow quantity data.

Figures 13, 14:
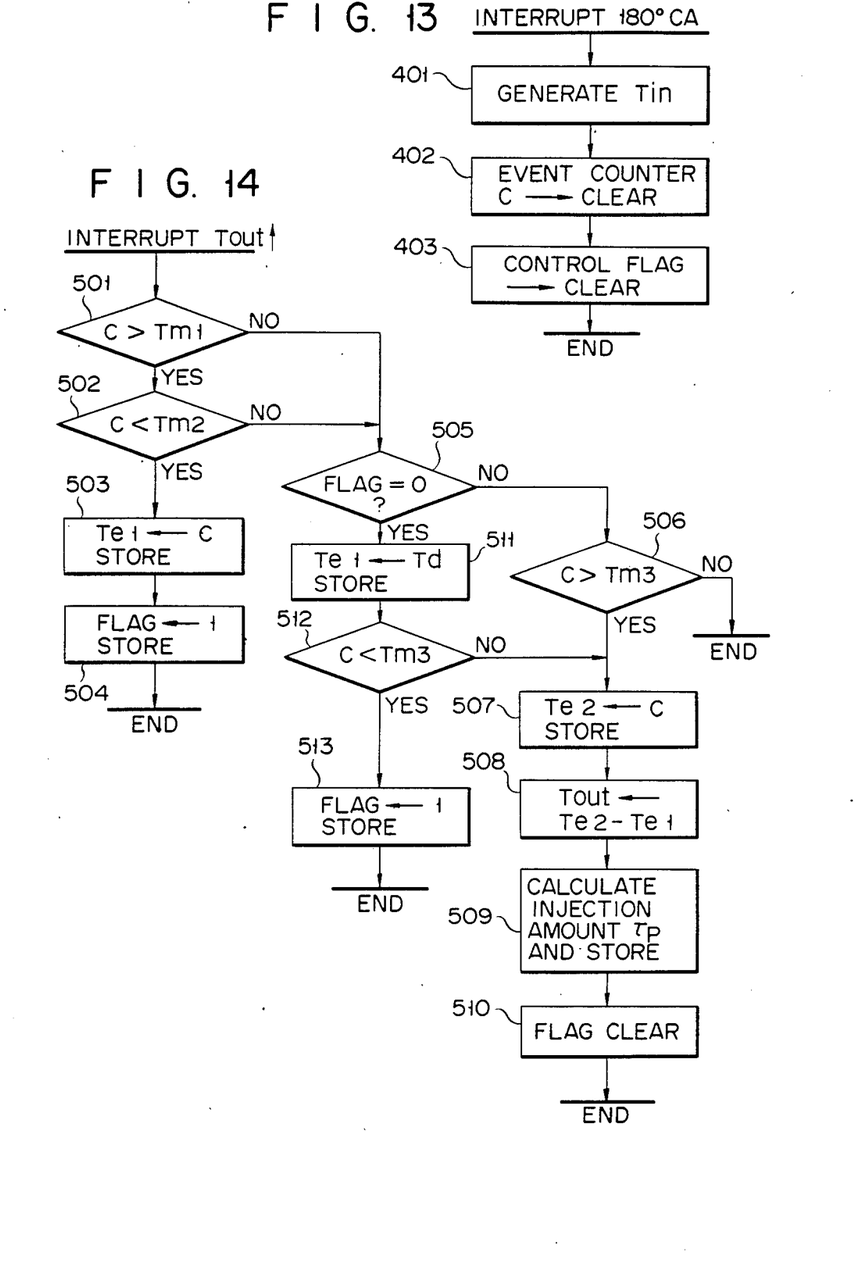
FIG. 13 is a flow chart of the start operation based on the start signal.
FIG. 14 is a flow chart of the processing which one part of the output signal is missing.

FIG. 13 shows the control flow in input signal processing section 250 of control unit 20 that accompanies the airflow measurement operation for generation of the measurement signal. In this control routine an interrupt operation is performed simultaneously with the rotation of the engine at specified angles of rotation of the crankshaft. The start pulse signal Tin may be generated in step 401 which corresponds to each 180° CA, for example. Then in the next step 402, the event counter C is cleared for every start pulse signal Tin and in step 403 the control flag is cleared.

The airflow quantity measurement operation is performed based on a start pulse signal Tin that is generated in this way and measurement detection signals Tout are generated in correspondence to these signals.

FIG. 14 shows the interrupt routine performed by input signal processing section 250 based on the leading edges of measurement signal Tout; i.e., the leading edge Te1 of first pulse P1 and the leading edge Te2 of second pulse shown in FIG. 12B. In step 501 the count value C of the event counter, which is cleared at the rise of the start pulse signal, is compared to the set reference time Tm1. If it is determined that the count C is larger than Tm1, control advances to step 502 and the count C is compared to set value Tm2 and if it is determined to be smaller than Tm2, the control advances to step 503. In other words, when it is determined that count C is between Tm1 and Tm2; i.e., when the first pulse P1 rises between time Tm1 and Tm2, control advances to step 503. It is then determined that first pulse P1 was generated normally in correspondence to start pulse signal Tin. This count value C, which represents the interrupt timing, is stored in the memory device as time Te1. At step 504 a control flag, which specifies the first pulse P1, is set at "1" and stored.

At steps 501 and 502, if interrupt timing C is not between set times Tm1 and Tm2, control advances to step 505. In step 505 it is determined whether the control flag is "0" and if it is not; in other words, "1", it is determined that the interrupt was a result of second pulse P2, and control advances to step 506.

In step 506 the current count value is compared with the minimum time interval Tm3 assumed when the airflow quantity is measured, and if count value C is larger than Tm3, control advances to step 507. The count C at this time is stored as time Te2. Then, in step 508 measurement time interval Tout is calculated from the time difference between time Te1 stored in step 504 and time Te2. Time interval Tout corresponds to airflow quantity G and, accordingly, in step 509 a fuel injection amount τP suitable for the current engine operating condition is calculated based on this time interval Tout. Then, in step 510 the control flag is cleared.

In step 506, if count value C is determined to be smaller than set value Tm3, the input signal which caused the interrupt is considered to be noise, and the routine is completed.

In step 505 if the control flag is "0", it is determined that the first pulse P1 is absent. In this case, control advances to step 511 and time Te1 is set to delay Td, which is a set time from the rise of start pulse signal Tin. Time Td is stored as time Te1 and control advances to step 512. In step 512 count value C is compared to set value Tm3 and if count value C is smaller than Tm3, a control flag of "1" is set in step 513. If it is determined in step 512 that count value C is larger than Tm3, it is determined that first pulse P1 is absent and that second pulse P2 has been input, and control advances to step 507. The count value C, which is the current interrupt time, is stored as Te2.

In the above description it was assumed that first pulse P1 is not supplied to engine control unit 20; however, it is possible for the second pulse P2 to be absent and not supplied to control unit 20. However, when second pulse P2 is absent and when count value C of the event counter equals the largest time interval that can be assumed for the airflow quantity measurement time interval; i.e., a time interval that is half the time interval of, for example, the previous start pulse signal and the present start pulse signal. In other words, when count value C is a value that corresponds to half the time interval of the above start pulse signal, and if the control flag is "1", it can be determined that the second pulse P2 is absent.

For determining that the second pulse P2 is absent, it is possible to use the previous measurement data instead because there is substantially very little variation in the intake airflow quantity between each measurement period, making it possible to perform smooth engine control.

What is claimed:

1. A heat-wire type airflow quantity measuring apparatus, comprising:
heat generating means arranged in an airflow to be measured for producing heat in response to heating power applied thereto, the resistance of said heat generating means varying with changes in temperature;
first signal generating means for periodically generating pulse-shaped start signals;
heating power supplying means for supplying said heating power to said heat generating means in response to the start signals;
temperature detecting means for producing a detection signal when the temperature of said heat generating means attains a specified temperature;
heating power cut-off means for cutting off the heating power supplied to said heat generating means in response to said detection signal;
second signal generating means for generating a pulse-shaped time signal representative of the time of supply of heating power to said heat generating means and which rises in correspondence with the start signal and is cut off by said cut-off means;
third signal generating means for generating a pair of first and second pulses corresponding to the rise and fall of the pulse-shaped time signal; and output means for generating an airflow quantity measurement signal representative of the interval between said pair of first and second pulses generated by said third signal generating means.

2. An apparatus according to claim 1, wherein said heat generating means is provided in an air intake pipe of an engine and said first signal generating means comprises means for generating a pulse-shaped start signal in correspondence to a specified rotation angle of the engine.

3. An apparatus according to claim 1, further comprising an engine having an air intake pipe and a rotatable crankshaft, an engine control unit which includes said first signal generating means for generating said start signal in correspondence with rotation angle signals which correspond to specified angles of crankshaft rotation, the airflow quantity measurement signal from said output means being supplied to said engine control unit which calculates a fuel injection quantity based on this airflow quantity measurement signal, and said heat generating means being provided in an air intake pipe of the engine.

4. An apparatus according to claim 1, wherein said third signal generating means comprises:
- a time constant circuit for receiving the pulse-shaped time signal generated by said second signal generating means;
- a comparator for comparing a signal output from said time constant circuit with a reference voltage, and for generating a signal which is delayed by a specified time interval from the rise and fall of the pulse-shaped time signal; and
- pulse forming means for forming said first and second pulses, on the basis of the pulse-shaped time signal generated by said second signal generating means and the signal output form said comparator.

5. An apparatus according to claim 1, wherein said third signal generating means is comprised of pulse generating means, which includes a time constant circuit for integrating the rising and falling portions of the pulse-shaped time signal generated by said second signal generating means, and a circuit for generating a pair of pulse signals having pulse widths which extend correspondingly with the times of rise and fall of the pulse-shaped time signal during which the level of a signal output of said time constant circuit exceeds a reference level.

6. An apparatus according to claim 5, wherein said pulse generating means includes a comparator for comparing the level of the signal output from said time constant circuit with said reference level, the output signal from said comparator is supplied to an exclusive OR circuit to which said pulse-shaped time signal is supplied, and said exclusive OR circuit generates a pulse signal for every transition of said time signal.

7. An apparatus according to claim 1, wherein said third signal generating means comprises a capacitor that forms a charging circuit when the pulse-shaped time signal is present and a discharging circuit when the pulse-shaped time signal is absent, and a comparator which compares the charge level of said capacitor with a set reference voltage.

8. An apparatus according to claim 7, wherein the charging and discharging circuit of said capacitor each comprises a constant current circuit.

9. An apparatus according to claim 7, further comprising a switch element which is turned on when the pulse-shaped time signal is absent to connect said discharge circuit to said capacitor and is turned off when the pulse-shaped time signal is present to cut off said discharge circuit such that said capacitor is charged by a current from said charging circuit.

10. An apparatus according to claim 7, further comprising first, second and third switch elements, said first switch element being turned off when the pulse-shaped time signal is present to cut off said discharge circuit, said second and third switch elements being connected in parallel to said charging and discharging circuits, said second switch element being closed when the output level of the comparator varies and the pulse-shaped time signal is present, said third switch element being closed when the output level of the comparator varies and the pulse-shaped time signal is absent.

11. An apparatus according to claim 10, wherein said charging and discharging circuits each comprise a constant current circuit.

12. An apparatus according to claim 10, wherein said second switch element is turned on when said comparator determines that the charge voltage of said capacitor is higher than said reference voltage and the pulse-shaped time signal is present, and said third switch element is turned off when said comparator determines that the charge voltage of said capacitor is lower than said reference voltage and the pulse-shaped time signal is absent.

13. An apparatus according to claim 1, wherein said third signal generating means comprises:
- a capacitor which is charged and discharged;
- first and second constant current circuits of which said first constant current circuit supplies a constant current to said capacitor and said second constant current circuit supplies a discharge current from said capacitor to a ground circuit;
- charging control means for cutting off said second constant current circuit in response to the rising edge of the pulse-shaped time signal and charging said capacitor with a current from said first constant current circuit;
- discharging control means for connecting said second constant current circuit with said capacitor in response to the fall of the pulse-shaped time signal to discharge said capacitor;
- rapid charging/discharging control means for rapidly charging or discharging said capacitor when the charge voltage rises or falls past a reference voltage;
- comparing means for generating alternately inverted output signals when the charge voltage of said capacitor rises and falls past said reference voltage; and
- output signal generating means, which includes an exclusive OR circuit to which the pulse-shaped time signal is supplied, and which generates a pulse signal for every inversion of the pulse-shaped time signal.

14. An apparatus according to claim 13, wherein said rapid charging/discharging means comprises a switch element connected in parallel to said first and second constant current circuits.

15. An apparatus according to claim 1, further comprising input signal processing means, which includes detection means for detecting an abnormal state of the first and second pulses generated by said third signal generating means, said detection means comprising flag memory means for storing a flag which is inverted in response to a pulse input after the rise of the start signal processing means is the first pulse; time interval measuring means for measuring a time interval between the rise of the start signal and the inputting of a following pulse; determining means for determining whether a time interval measured by the time interval measuring means falls within a preset reference time interval; delay time setting means for setting a specified delay time when flag memory means indicates that a pulse input after the rise of the start signal is the first pulse and a time interval measured by said time interval measuring means falls outside the reference time interval; and means for storing, as the first pulse generation timing, the time at which the reference time interval ends after the rise of the signal, when said flag memory means indicates that a pulse input after the rise of the start signal is the first pulse and a time interval measured by said time interval measuring means falls outside the reference time interval.

16. An apparatus for measuring the airflow quantity in an air intake pipe of an engine, comprising:

heat generating means provided in the airflow of the intake pipe for generating heat when heating power is supplied thereto and whose resistance varies in response to changes in temperature;

first signal generating means for generating pulse-shaped start signals simultaneously with a specified angle of rotation of the engine;

heating power supply means, for supplying heating power to said heat generating means in response to the start signals generated by said first signal generating means;

temperature detecting means for detecting when the temperature of said heat generating means, which is heated by the heating power, has risen to a specified temperature;

heating power cut-off means for cutting off the heating power supplied to said heat generating means based on a detection signal from said temperature detecting means;

second signal generating means for generating a pulse-shaped time signal which represents the time that heating power is supplied to said heat generating means and which rises in correspondence with the start signal and falls simultaneously with the cut off of heating power;

third signal generating means for generating first and second pulses corresponding to the rise and fall of the pulse-shaped time signal generated by said second signal generating means; and output means for supplying a signal representing the time interval between the first and second pulses of said third signal generating means to an engine control unit as an intake airflow quantity measurement signal.

17. An apparatus according to claim 16, wherein said first signal generating means generates a periodic pulse-shaped start signal every 180° of engine crankshaft rotation.

* * * * *